(12) United States Patent
Bleikolm et al.

(10) Patent No.: US 6,472,455 B1
(45) Date of Patent: Oct. 29, 2002

(54) INK COMPOSITION COMPRISING FIRST AND SECOND OPTICALLY VARIABLE PIGMENTS

(75) Inventors: Anton Bleikolm, Ecublens (CH); Olivier Rozumek, St. Martin (CH); Edgar Müller, Lausanne (CH)

(73) Assignee: SICPA Holding S.A., Prilly (CH)

( * ) Notice: Subject to any disclaimer, the term of this patent is extended or adjusted under 35 U.S.C. 154(b) by 0 days.

(21) Appl. No.: 09/555,879

(22) PCT Filed: Oct. 8, 1999

(86) PCT No.: PCT/EP99/07572

§ 371 (c)(1),
(2), (4) Date: Aug. 24, 2000

(87) PCT Pub. No.: WO00/22049

PCT Pub. Date: Apr. 20, 2000

(30) Foreign Application Priority Data

Oct. 8, 1998 (EP) .............................................. 98118992

(51) Int. Cl.⁷ ......................... C09D 11/02; C09D 11/10; C09C 1/62

(52) U.S. Cl. ........................................ 523/160; 106/403
(58) Field of Search ................................ 523/160, 161; 106/403, 31.6; 428/402, 403

(56) References Cited

U.S. PATENT DOCUMENTS

| | | | | | |
|---|---|---|---|---|---|
| 4,328,042 | A | * | 5/1982 | Ostertag et al. | 106/403 |
| 4,879,140 | A | * | 11/1989 | Gray et al. | 427/490 |
| 5,855,660 | A | * | 1/1999 | Bujard et al. | 106/418 |
| 5,871,827 | A | * | 2/1999 | Jaffe et al. | 428/29 |
| 6,139,613 | A | * | 10/2000 | Henderickson et al. | 106/415 |
| 6,210,777 | B1 | * | 4/2001 | Vermeulen et al. | 428/195 |

FOREIGN PATENT DOCUMENTS

| WO | WO 96/39307 | * | 12/1996 |
|---|---|---|---|
| WO | WO 98/12583 | * | 3/1998 |

* cited by examiner

*Primary Examiner*—Vasu Jagannathan
*Assistant Examiner*—Callie E. Shosho
(74) *Attorney, Agent, or Firm*—Shoemaker and Mattare

(57) ABSTRACT

An ink composition containing at least two different types of optically variable pigments which produce a film or coating having a viewing angle dependent color shift.

35 Claims, 8 Drawing Sheets

Figure 1A:
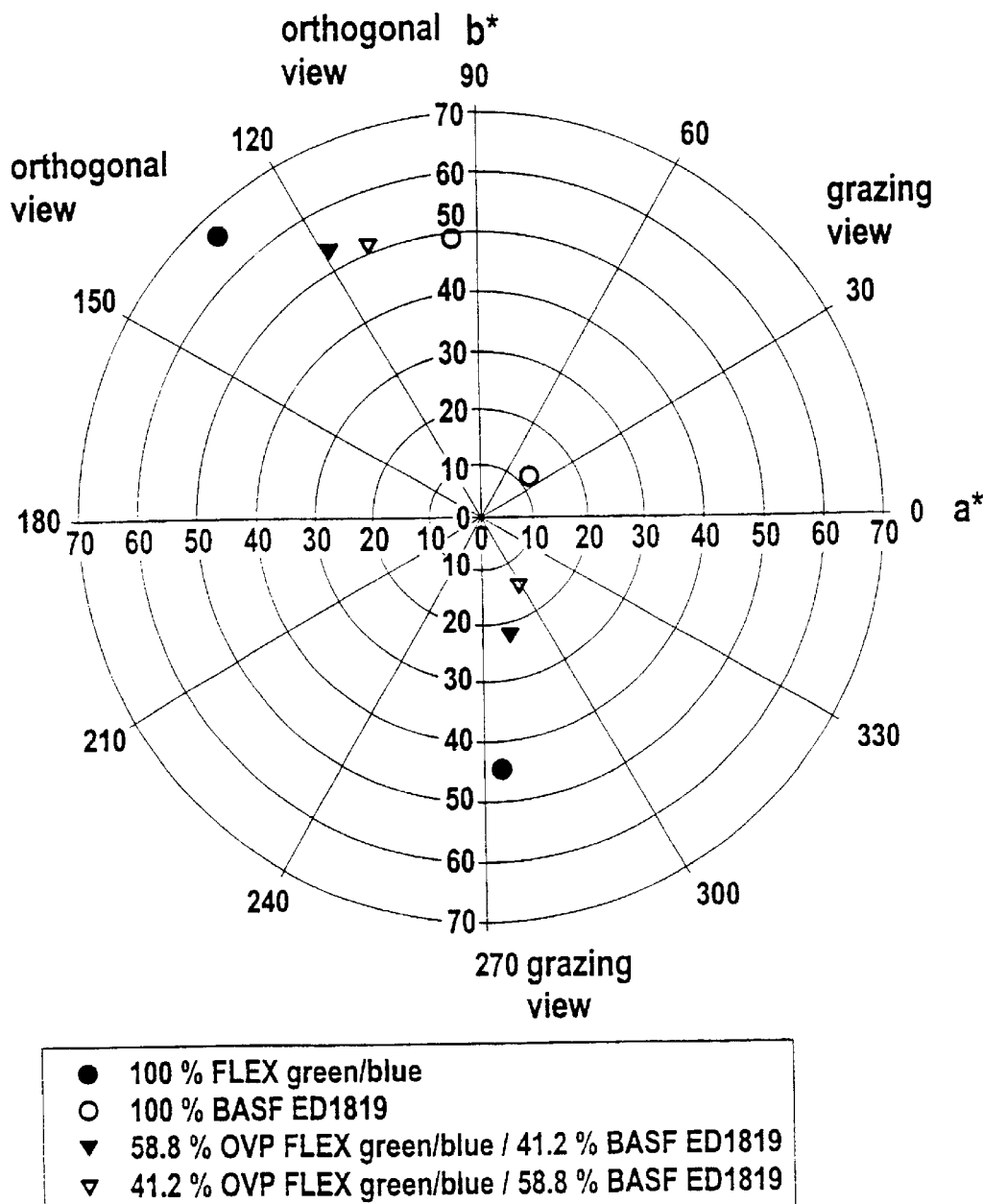

Blends of OVP FLEX green/blue and BASF ED1819

CIELAB color space: C* versus h
$C^* = \sqrt{a^{*2} + b^{*2}}$
$h = \arctan(a^* / b^*)$

- ● 100 % FLEX green/blue
- ○ 100 % BASF ED1819
- ▼ 58.8 % OVP FLEX green/blue / 41.2 % BASF ED1819
- ▽ 41.2 % OVP FLEX green/blue / 58.8 % BASF ED1819

Blends of OVP FLEX magenta/green and BASF ED1820

CIELAB color space: C* versus h
$C^* = \sqrt{a^{*2} + b^{*2}}$
$h = \arctan(a^* / b^*)$

- ● 100 % OVP FLEX magenta/green
- ○ 100 % BASF ED1820
- ▼ 58.8 % OVP FLEX magenta/green / 41.2 % BASF ED1820
- ▽ 41.2 % OVP FLEX magenta/green / 58.8 % BASF ED1820

Blends of OVP FLEX green/blue and BASF ED1820

CIELAB color space: C* versus h
$$C^* = \sqrt{a^{*2} + b^{*2}}$$
$$h = \arctan(a^* / b^*)$$

- ● 100 % FLEX green/blue
- ○ 100 % BASF ED1820
- ▼ 58.8 % OVP FLEX green/blue / 41.2 % BASF ED1820
- ▽ 41.2 % OVP FLEX green/blue / 58.8 % BASF ED1820

Blends of OVP FLEX blue/red and BASF ED1820

CIELAB color space: C* versus h
$C^* = \sqrt{a^{*2} + b^{*2}}$
$h = \arctg(a^* / b^*)$

- ● 100 % OVP Flex blue/red
- ○ 100 % BASF ED1820
- ▼ 58.8 % OVP FLEX blue/red / 41.2 % BASF ED1820
- ▽ 41.2 % OVP FLEX blue/red / 58.8 % BASF ED1820

Blends of OVP FLEX magenta/green and BASF ED1821

CIELAB color space: $C^*$ versus $h$ $$C^* = \sqrt{a^{*2} + b^{*2}}$$

$$h = \operatorname{arctg}(a^* / b^*)$$

- ● 100 % OVP FLEX magenta/green
- ○ 100 % BASF ED1821
- ▼ 58.8 % OVP FLEX magenta/green / 41.2 % BASF ED1821
- ▽ 41.2 % OVP FLEX magenta/green / 58.8 % BASF ED1821

Blends of OVP FLEX green/blue and BASF ED1821

CIELAB color space: C* versus h
$C^* = \sqrt{a^{*2} + b^{*2}}$
$h = \arctan(a^* / b^*)$

- ● 100 % FLEX green/blue
- ○ 100 % BASF ED1821
- ▼ 58.8 % OVP FLEX green/blue / 41.2 % BASF ED1821
- ▽ 41.2 % OVP FLEX green/blue / 58.8 % BASF ED1821

Blends of OVP FLEX blue/red and BASF ED1821

CIELAB color space: C* versus h
$C^* = sqrt(a^{*2} + b^{*2})$
$h = arctg(a^* / b^*)$

- ● 100 % OVP FLEX blue/red
- ○ 100 % BASF ED1821
- ▼ 58.8 % OVP FLEX blue/red / 41.2 % BASF ED1821
- ▽ 41.2 % OVP FLEX blue/red / 58.8 % BASF ED1821

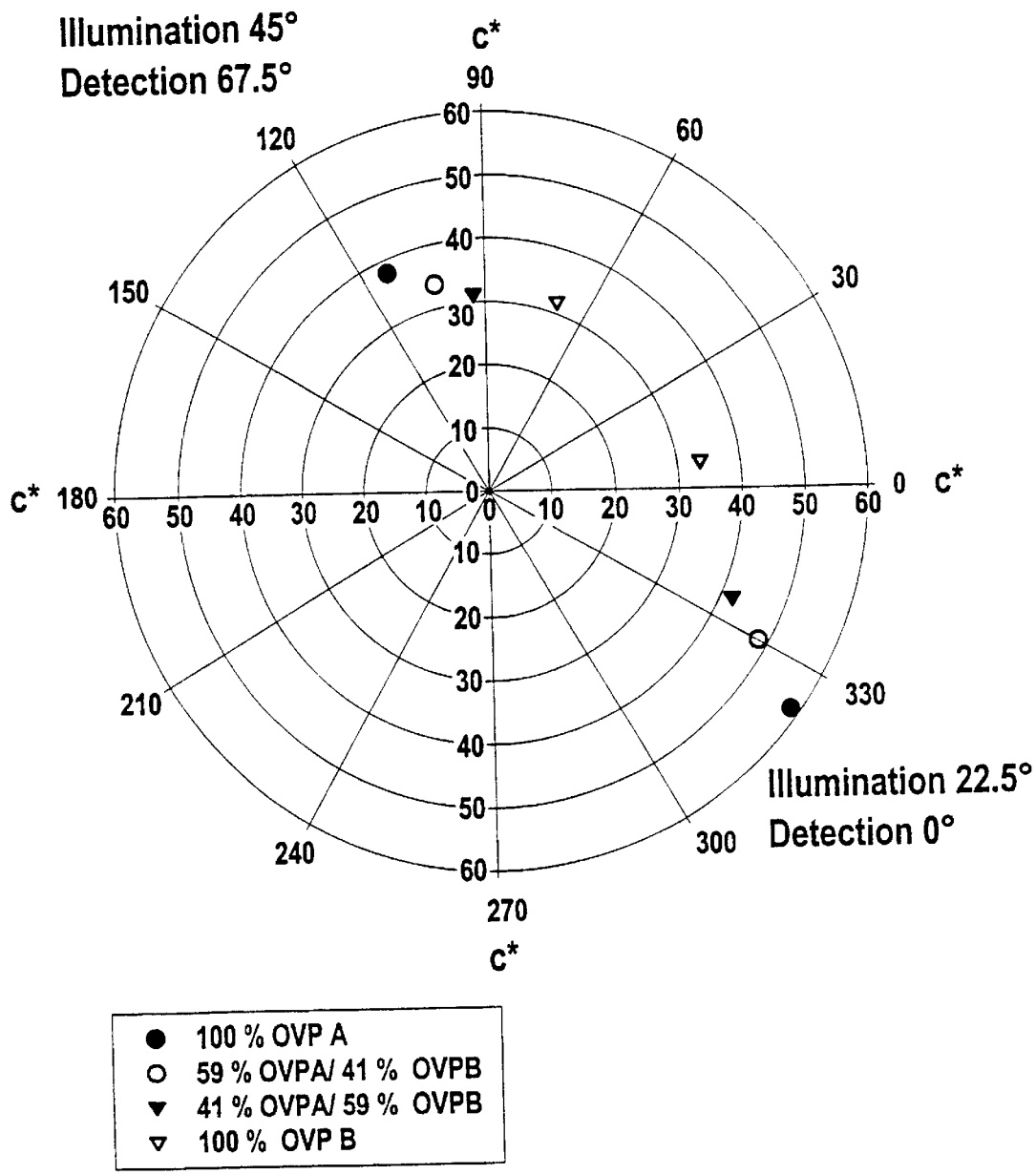
Fig. 2  Coloristic measurements. Polar diagramme of C* and h.
Measurements performed on PHYMA Penta Gonio PG-5.
Silkscreen prints made with a Hand Coater n° 3

INK COMPOSITION COMPRISING FIRST AND SECOND OPTICALLY VARIABLE PIGMENTS

This invention relates to a printing ink composition comprising first and second multi-layered thin-film interference pigments showing a colour shift which depends on the viewing angle.

Pigments consisting of thin multi-layered film interference structures which show a viewing-angle dependent shift of colour have been described in various publications as, for example, L. Schmid, M. Mronga, V. Radtke, O. Seeger "Luster pigments with optically variable properties", European Coatings Journal, 7–8/1997, and patents, e.g. U.S. Pat. No. 4,434,010, U.S. Pat. No. 5,059,245, U.S. Pat. No. 5,084,351, U.S. Pat. No. 5,281,480.

The general principle of these types of interference pigments is basically a sequence of alternate thin layers parallel to each other consisting of partially and/or totally reflecting materials and low refractive index material. The hue, the colour-shift and chroma of these multi-layered interference pigments, which will be abbreviated hereinafter as OVP (Optically Variable Pigments), depend on the material of the layers, the sequence of the layers, the number of layers and the layer thicknesses but also on the production process. OVP may be produced by two different categories of processes:

1. Physical vapour deposition (PVD) technologies:

Summarized, the method consists in forming a multi-layered, thin film coating by advanced PVD techniques such as roll coaters, sputtering techniques, etc. on a flexible web of a material, which is preferably soluble in a predetermined solvent. The web is typically a polymer material, such as polyvinyl alcohol or polyethyleneterephthalate. After separating the web from the multi-layered, thin film coating, flakes are produced therefrom by shredding or grinding them down to the desired flake size. The separation can be accomplished by stripping the multi-layered coating from the web. For this, preferably a stripping layer is deposited onto the web prior to the other layers. Heat and/or solvent may be used to facilitate the stripping process. Alternatively, instead of stripping, the web may be dissolved in a suitable solvent to accomplish the separation. The coated web may optionally be cut or shredded prior to the dissolution step. As the multi-layered thin film coating is separated from the web, it typically breaks into pieces of irregular shapes and sizes. These pieces usually require further processing to achieve the desired flake size which is suitable for use as pigment flakes in coating compositions and particularly ink compositions. The flakes can be ground down to a size ranging from 2–5 microns without destroying their colour characteristics. Preferably the average particle size is between 5 and 40 microns, but not greater than 120 microns. The flakes are produced to have an aspect ratio of at least 2:1. The aspect ratio is ascertained by taking the ratio of the largest dimension of a surface of the flake parallel to the planes of the layers to the thickness dimension to the flake (perpendicular to the plane). The flakes can be achieved by all major categories of processing known in the art such as milling, grinding or ultrasonic agitation, optionally in the presence of solvents and/or further auxiliary materials.

OVP produced by this production process are characterized in that the pigment flakes consist of a stack of plane layers lying parallel to each other with outer pigment flake surfaces parallel to each plane layer. Due to the shredding and grinding process, the surfaces of the pigment flake perpendicular to the plane of the layers are irregularly formed with the inner layers not covered by the outer layers. OVP having these characteristics will be referred to hereinafter as OVP A.

2. By wet chemical type reactions or Chemical Vapour Deposition (CVD)—U.S. Pat. No. 4,328,042:

The principle of the chemical synthesis of OVP is to coat commercially available plate-like reflecting pigments with a predetermined number of weakly refracting and semi-opaque thin films. A typical process of this kind may be described more exactly by means of a specific production process run:

In a first step the plate-like pigments are suspended in an alcohol with dispersion aids. Tetraethoxysilane and an aqueous solution of ammonia is continuously added to this solution. Under these conditions, tetraethoxysilane is hydrolysed and the resulting hydrolysis product, the hypothetical silicic acid $Si(OH)_4$, condenses and forms $SiO_2$ as a smooth film on the surfaces of the plate-like pigments. The $SiO_2$-coating can also be carried out in a fluidized-bed reactor. In this case, vapours of tetraethoxysilane must react with water vapour. However, at the preferred temperatures of the gas-phase deposition (100–300° C.), tetraethoxysilane does not react in satisfactory yields. Special precursors, which are more reactive have to be used. Suitable precursors are of $Si(OR)_2(OOCR)_2$-type. They vaporize at 150° C. and decompose easily with water at 200° C.

Subsequently in a chemical vapour deposition process, the silicon oxide-coated pigments are coated with metal oxides or metal films. The coating takes place in a fluidized-bed reactor. The $SiO_2$ coated pigments are fluidized with inert gases, which are charged with gaseous metal carbonyls. At 200° C. the carbonyls decompose. If iron carbonyl is used, it can be oxidized to $Fe_2O_3$, which forms smooth thin films on the pigment surfaces. As an alternative method, the iron oxide coating can be carried out in a sol-gel technique known from conventional micas.

When the carbonyls of chromium, molybdenum or tungsten are decomposed under inert conditions, metallic films can be obtain. Since Mo films are not stable against water attack, they are therefore converted to molybdenum sulphide.

OVP produced by this process possess just one coherent surface. The outer coatings surround and encompass inner coatings and/or the reflective core flake. Because of this, the outer layers are not planes, but are substantially parallel to each other. The outer pigment surface is not continuously parallel to the first and second surface of the plate-like reflecting pigment. OVP showing these shape characteristics will be referred to hereinafter as OVP B.

Irrespective of whether type OVP A or OVP B, OVP includes a totally reflecting layer of a material which in the majority of cases is a metal such as aluminum, gold, copper or silver or a metal-oxide or even non-metallic materials. The first reflecting layer has a suitable thickness in the range of 50–150 nm but can be up to 300 nm. Deposited onto the totally reflecting material is a material with a low-refractive index; such material is often called dielectric material. This layer of a dielectric material must be transparent, with a refraction index not higher than 1.65. $SiO_2$ or $MgF_2$ are the preferred dielectric materials. The subsequent semi-opaque layer or layers are of a metal, metal oxides or sulphids as, for example, aluminum, chromium, $MoS_2$ or $Fe_2O_3$. Opaqueness of metal is a function of the layer thickness. Aluminum, for example, becomes opaque at approximately 35 to 40 nanometers. Typically the thickness of the semi-opaque layer is between 5 to 10 nanometers. The thickness of the dielectric layer depends on the colour desired. It is thicker if longer wave-lengths are required. OVPA can be of a symmetrical or asymmetrical multi-layered structure with regard to the totally reflecting layer.

A quantification of calorimetric properties is possible through the CIELAB color space diagram. In the CIELAB color space, $L^*$ indicates lightness, and $a^*$ and $b^*$ are the chromaticity coordinates. In the diagram, $+a^*$ is the red direction, $-a^*$ is green, $+b^*$ is yellow, and $-b^*$ is blue. Chroma $C^*=\text{sqrt}(a^{*2}+b^{*2})$ increases from the center of the circle outward. Hue angle $h=\text{arctg}(a^*/b^*)$ is $0°$ along the $+a^*$-axis, $90°$ along the $+b^*$-axis, $180°$ along the $-a^*$-axis, $270°$ along the $-b^*$-axis and $360°$ (same as $0°$) along the $+a^*$-axis(see Römpp Chemie Lexikon, "Lacke und Druckfarben", Ed. U. Zorll, Georg Thieme Verlag Stuttgart, New York 1998).

The flatness of the OVP A flakes allow a parallel orientation both to the underlying substrate and to each other when incorporated in an ink composition and printed. The therewith coated surface presents in consequence almost ideal reflecting conditions at the characteristic wavelengths of the OVP. In combination with flake characteristics which are the result of the PVD production process (plane-parallel layers, absolutely plane and smooth surfaces of the individual layers, minimal deviation of layer thicknesses compared to the predetermined and desired value) a high degree of color saturation (chroma) and the largest amount of color shift possible with OVP of such construction is attained.

Due to large amount of colour shift OVP A has found wide application in copy-preventing applications for security documents such as banknotes, checks, credit cards, passports, identity cards, driving licenses, postage stamps etc.

Inspite of the favourable properties with respect to anti-counterfeiting applications coating composition having comprised OVP A show disadvantages.

As OVP A is obtained by committing larger areas of a multi-layer interference film, the resulting flakes have open edges, where the inner layers are accessible to chemical attack by the environment. This results in a somewhat lower chemical stability of OVP-A even when the flakes are incorporated in a cured ink layer. This is particularly a mayor drawback .for the application on currency such as bank notes. The requirements for chemical resistance of the printing was established by Interpol at the 5th International Conference on Currency and Counterfeiting in 1969 or the Bureau of Engraving and Printing test methods as stated in BEP-88-214 (TH) section MS.

Bright shades, intensive hues and high chroma, are very often incompatible with the artistic aspects of currency design; strong color shifting properties, on the other hand, are the principal (copy preventing) feature justifying the use of OVP. Attempts to reduce the dramatic visual appearance of coatings comprising OVP-A have therefore already been made. OVP-A can be blended with conventional colored or black pigments to attain this and other, related goals (cf. "Counterfeit deterrent features for the next-generation currency design", Publication NMAB-472, National Academy Press, Washington, 1993, pp 55–58, and references cited herein). However the mixture with black result in a dull and covered colour. Another method, according to the teaching of EP 07,36,073, consists in blending OVP-A with suitable mica pigments, whereby the shade of the mica pigment is chosen to be similar to either the normal view color or the grazing view color of the OVP-A in question. However it results that the second color of the OVP is strongly perturbed in such mixtures, leading to an unsatisfactorily small color shift which is sometimes not even perceptible for the human eye. Therefore the mixture is unsuitable for anti-counterfeiting applications.

Moreover OVP A is expensive due to the costly production machines and process.

OVP B is cheaper, however the colour shift of coating composition comprising OVP B is weak, sometimes not even perceptible to the human eye, e.g. when shifting within one shade, eg. red. Therefore printing inks comprising OVP B are not suitable for copying preventing applications on security documents.

It is the object of the present invention to overcome the drawbacks of the prior art.

Particularly it is an object of the invention to lessen the chroma of an ink layer comprising OVP A while preserving a colour shift which is sufficient for applications on security documents.

It is a further object to increase the chemical resistance of cured layers comprising OVP A.

The object was solved by an ink composition comprising a polymer resin binder and first optically variable dichroic pigment flakes consisting of a committed multi-layered thin film interference structure comprising a stack of entirely parallel and plane layers in which at least one of the-layers is totally reflecting, having first and second plane surfaces parallel to each other, and deposited on at least one of the plane surfaces at least one transparent dielectric layer, the ink composition further comprises second optically variable multi-layered thin film dichroic pigments comprising a reflecting plate-like core layer in which the reflecting core layer is completely enclosed by at least one transparent dielectric layer and/or semi-opaque metal or metal-oxide layer. The first and second optically variable dichroic pigments are selected such that they are not antagonistic to each other. "Antagonistic" in the CIELAB colour-measuring system means that the shades (chroma+hue) of both of the orthogonal and of the grazing view of the first and the second optically variable dichroic pigment are related by a center of inversion.

OVP-blending follows the rules for additive color mixing, i.e. blending red and green OVP yields yellow. Subtractive color mixing, using red and green conventional pigments, would yield black. For this reason, mixing OVP pairs with partly "antagonistic" properties (i.e. having either complementary colors, or counter-acting color shifts) can yield very interesting results.

By blending OVP A and OVP B a reduction of chroma of OVP A is achieved. Beside the reduction of the chroma of OVP A, it has unexpectedly been found that a blend of these two types of OVP maintains a clear colour shift between two distinct shades (perceivable by the human eye), e.g. green to blue, magenta to green even when OVP B quantitatively dominates in the blend. This makes the OVP-blend suited for security applications.

Preferably the chroma $C^*$ (orthogonal view) of the first optically variable dichroic pigment is equal or above 50, more preferably equal or above 55 and even more preferably equal or above 60, whereas the chroma $C^*$ (orthogonal view) of the second optically variable pigment is below 50 preferably below 40 and even more preferably below 30.

An unexpected synergistic effect is the improvement of the chemical resistance of the cured ink layer even if the amount of pigments of OVP A exceed the amount of OVP B. The chemical resistance of cured ink layers comprising blends of OVP A and OVP B instead of just OVP A is particularly strengthened against 2% caustic soda solution, sodium sulphide and industrial laundry.

A preferred embodiment of the present invention is an ink composition comprising a polymer resin binder and first optically variable thin film dichroic pigment flakes consisting of a committed multi-layered thin film interference structure comprising a stack of parallel and plane layers in which at least one of the layers is of a reflecting material having first and second plane surfaces parallel to each other and disposed on at least one of the plane surfaces at least one transparent dielectric layer, the ink composition further comprising second optically variable thin film dichroic pigments comprising a reflecting plate-like core layer which is completely enclosed by at least one transparent dielectric layer and/or a semi-transparent metal or metal-oxide layer whereby the two dichroic hues of the first and second optically variable, thin film, dichroic pigment flakes are substantially the same. The first thin film multi-layered interference structure corresponds to OvP A and the second multi-layered interference structure corresponds to OVP B.

The perception of colour is very subjective, and what one observer would call "red" another might call "orange-red". However, as used throughout this specification and appended claims, the colour names are defined as follows: red is any transmitted or reflected colour of a wavelength of between about 610 and about 700 nm; orange is any transmitted and reflected colour of between about 590 and 610 nm; yellow is any transmitted or reflected colour of between about 570 and 590 nm; green is any transmitted and reflected colour between about 500 and about 570 nm; blue is any transmitted or reflected colour of between about 460 and about 500 nm; and violet or purple is any transmitted colour of between about 400 and about 460 nm. In another definition, the expression "substantially the same hues" means that the hues designated by values of a* and b* are not differing more than 60 degrees from each other on the CIELAB colour-measuring system.

Preferably good results are obtained when the hue values at the midpoint between orthogonal and grazing view were approximately equal for both, the OVP A and the OVP B.

"Approximately equal" means that the difference between the midpoints is not more than 30°.

Particularly good results are obtained when the first multi-layered thin film interference structure (OVP A) has a symmetric construction in respect to the first reflecting layer. In this case on both of said first and second surfaces of the reflecting layer, at least one transparent dielectric layer with an index of refraction not higher than 1.65 is deposited in such a way that the resulting dielectric layers are plane and parallel to the surface of the reflecting layer.

The visual effects of the first multi-layered thin film interference structure, OVP A, is enhanced when a semi-opaque metal or metal-oxide layer is deposited on at least one of the dielectric layers. The same is true for the second multi-layered thin film interference structure, OVP B, in case the dielectric layer is surrounded by a semi-opaque metal or metal-oxide layer.

Preferred materials for both multi-layered interference structures are chromium for the semi-opaque layer and aluminum for the reflecting layer.

In an ink composition of the present invention, the blend ratio of the first and second multi-layered thin film interference structure (OVP A to OVP B) should be in a ratio of 1:10 to 10:1, preferably in a ratio of 1:1.5 to 1:0.6.

The ink composition of the present invention may further comprise additional non-interference pigments.

Blends of OVP A and OVP B can be incorporated in any suitable ink vehicle as long as the ink vehicle is not detrimental to the visual appearance of the OVP. Particularly it must not cover the optical effects of the pigment and must not be aggressive to the layer materials. Generally ink vehicles comprise at least one film-forming polymeric binder, solvents, optionally water, extenders and auxiliary agents such as non-foaming-, wetting-, rheology-control agents, antioxidants, etc.

The ink layer can be applied to the underlying substrate by any of the known printing techniques, in particular by intaglio, flexographic, gravure and silk-screen printing.

An ink composition comprising first and second multi-layered interference structures is preferably used for printing security documents such as bank notes, cheques, credit cards, etc. The colour shifting properties of an image printed by using such an ink composition are not reproducible by photocopying and as such impart to the document a strong security feature. Besides the application in security documents, an ink of the kind described by the present invention can be used by any commercial application in which this special decorative effect is desired.

The invention is further described by the examples.

EXAMPLE 1

Three different OVP-A (magenta-to-green (M/G), green-to-blue (G/B) and blue-to-red (B/R)) (all Flex Products Inc, Santa Rosa, USA) were blended with two different OVP-B ED 1820 and ED 1821 (BASF AG) at different ratios. Additionally OVP A green-to-blue was mixed with OVP B BASF ED 1819. In all cases, the chroma of the blend was efficiently lowered, and the blends were found to show surprisingly large optical color shifting properties

| Blends: visual effects (color shift) under daylight | | | |
|---|---|---|---|
| | OVP A:<br>FLEX M/G | OVP A:<br>FLEX G/B | OVP A:<br>FLEX B/R |
| OVP B:<br>ED 1819 | | Good<br>Green/<br>Steel blue | |
| OVP B:<br>ED 1820 | Good<br>Magenta/<br>Silver green | Medium<br>Silver green/<br>Steel blue | Medium<br>Violet/<br>Khaki |
| OVP B<br>ED 1821 | Very Good<br>Magenta/<br>Green | Good<br>Green/<br>Blue-black | Good<br>Violet/<br>Brown |

Figure 1B:
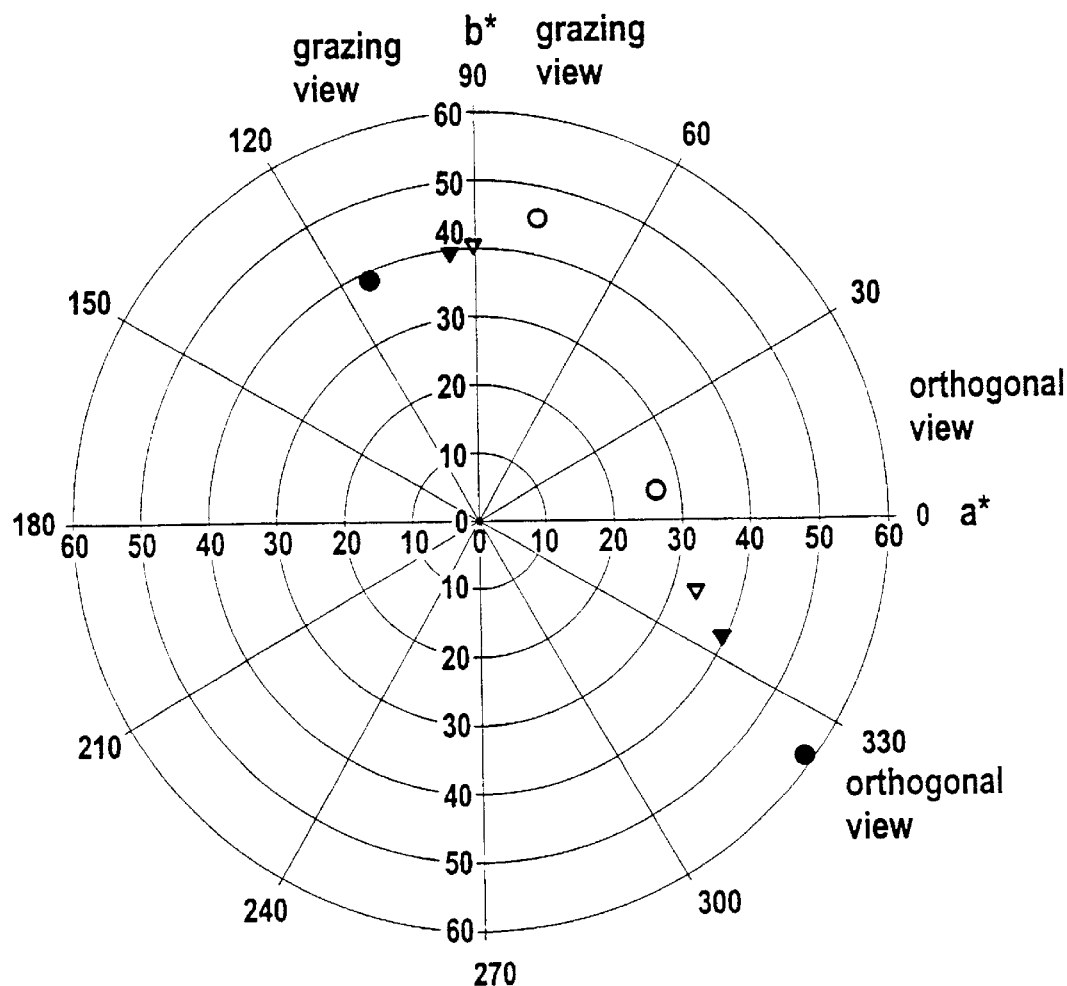
Figure 1C:
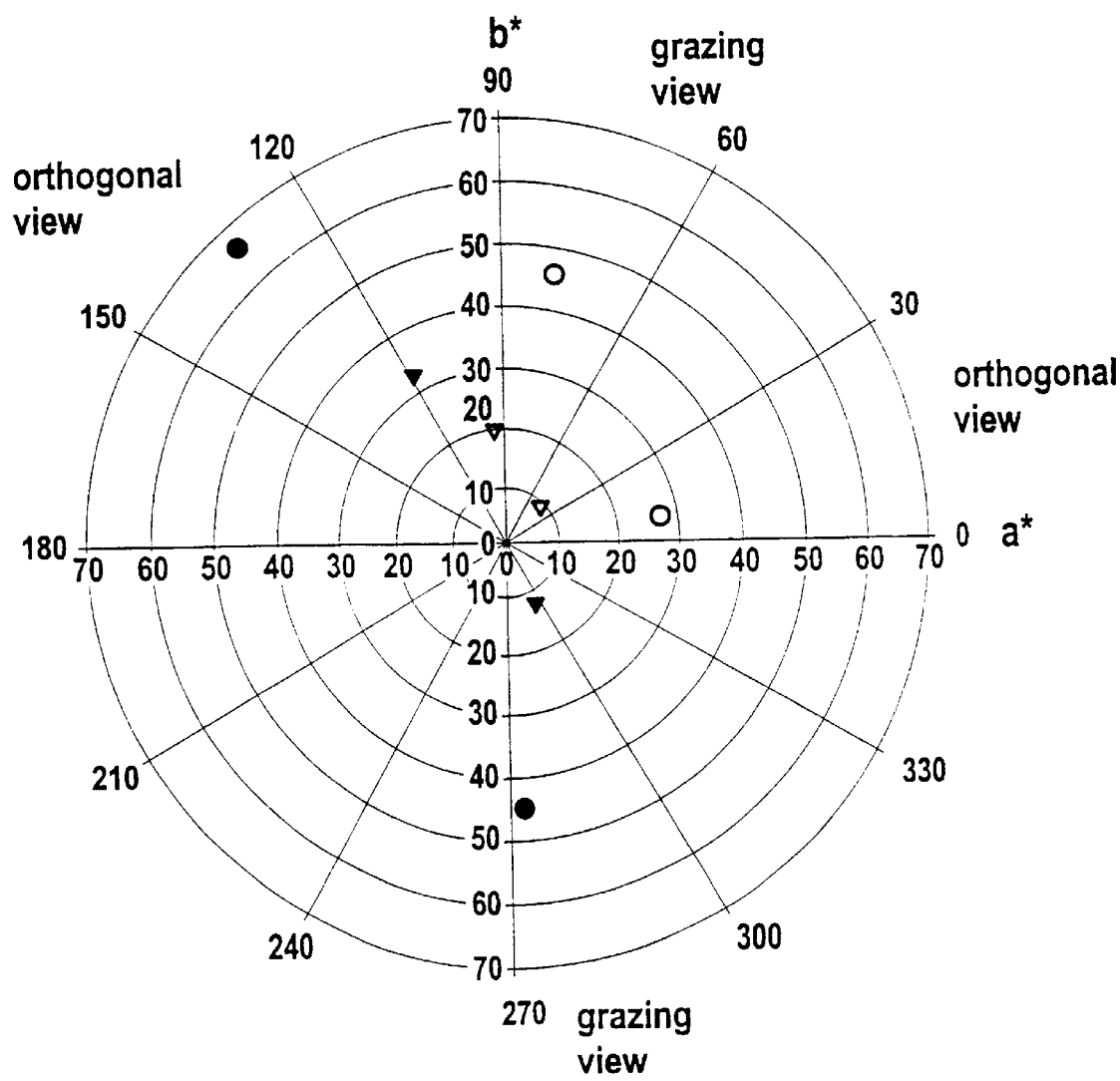
Figure 1D:
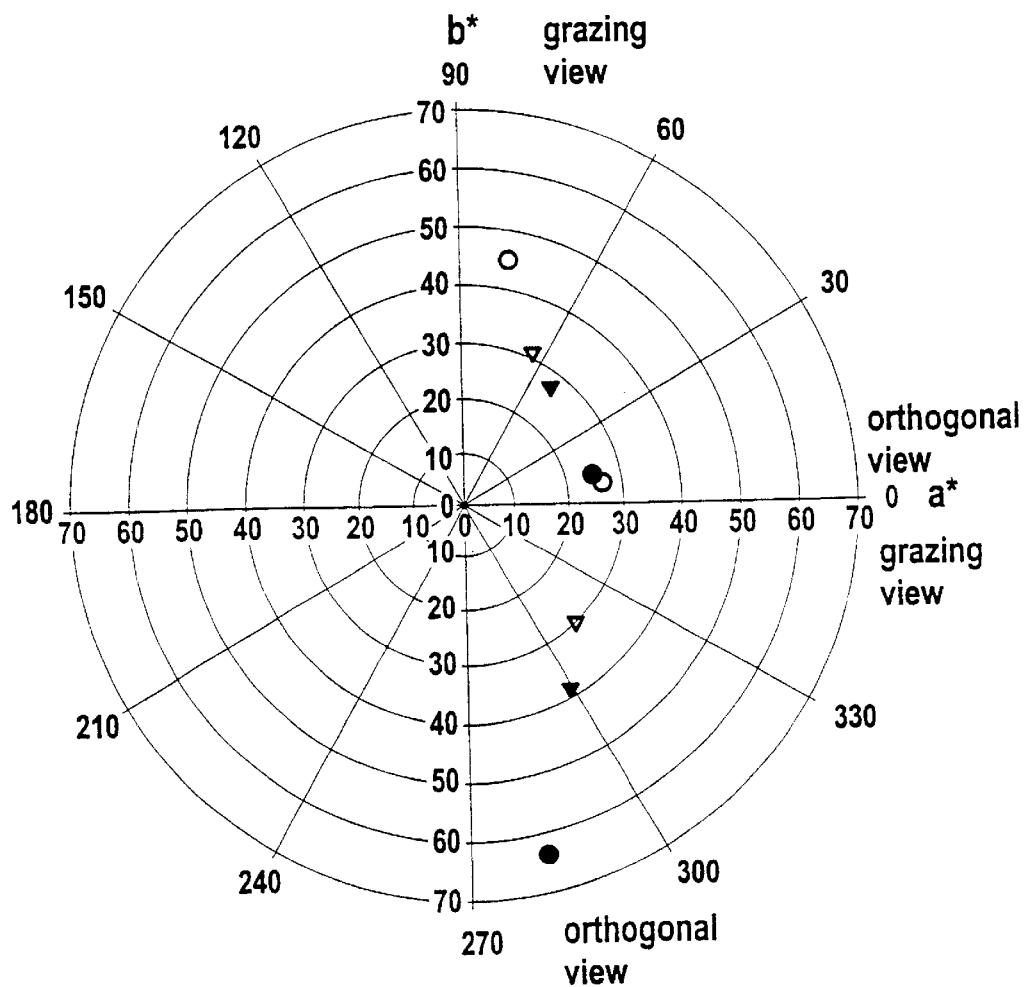
Figure 1E:
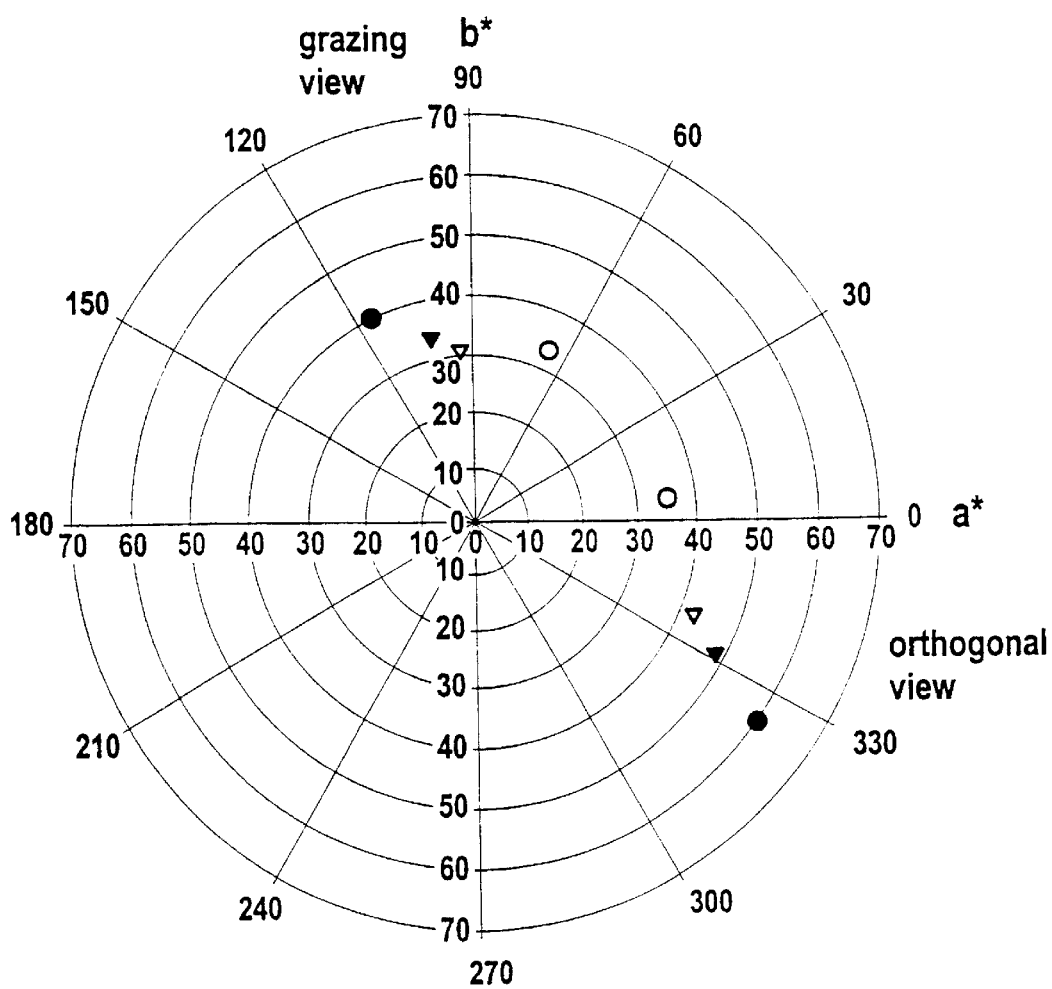
Figure 1F:
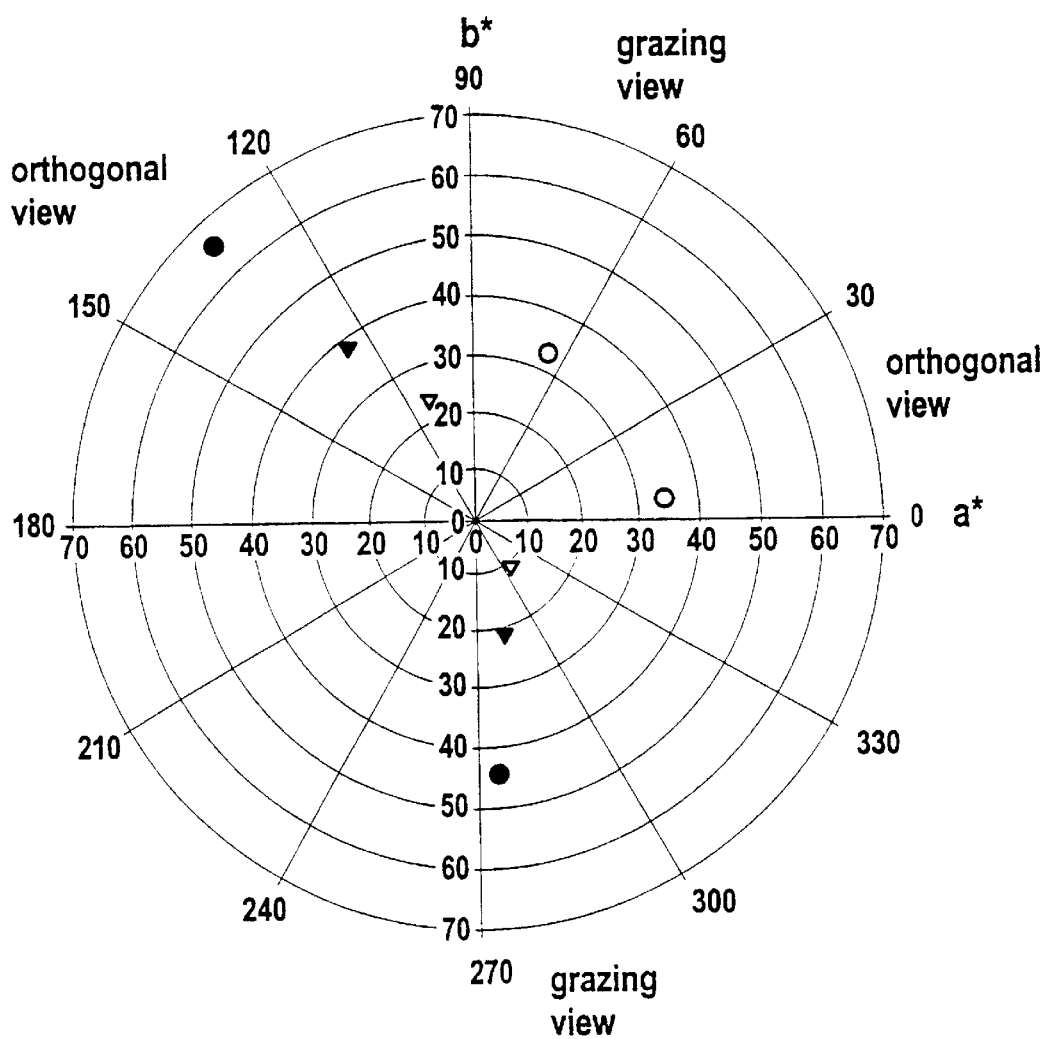
Figure 1G:
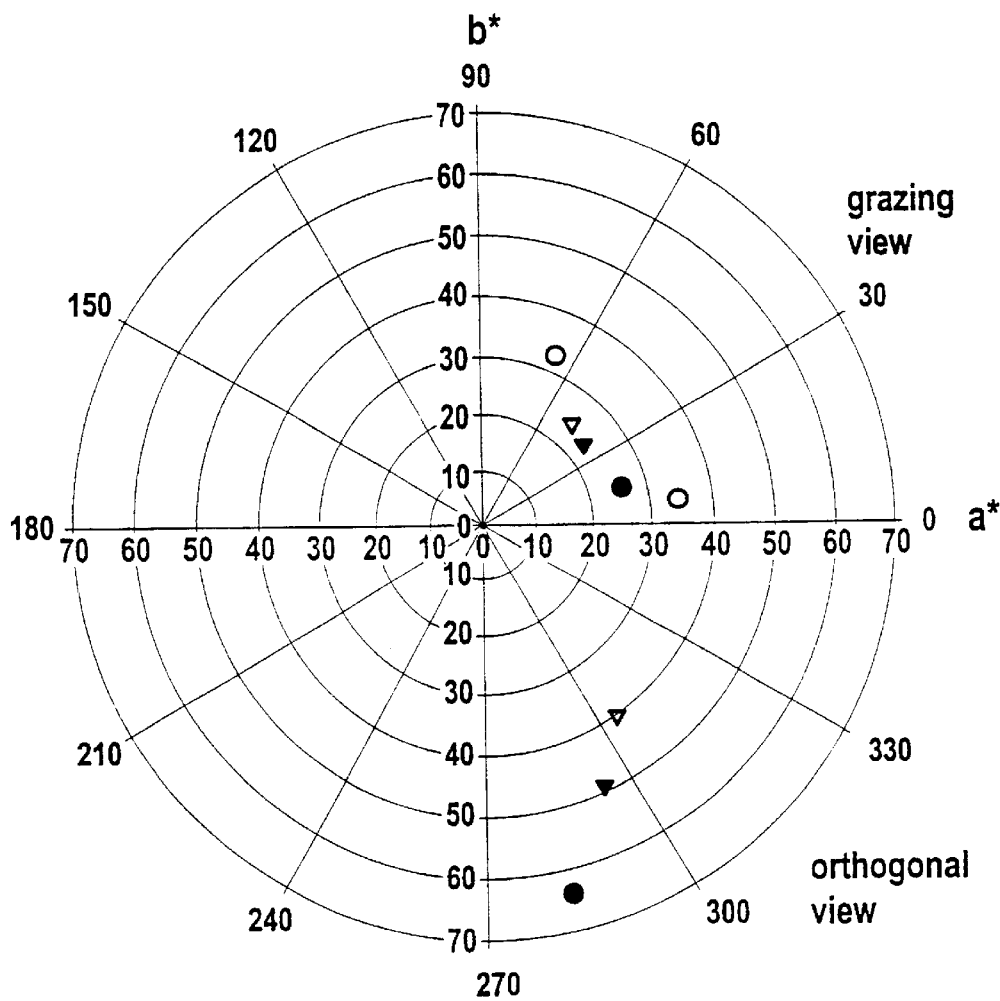

The indicated colors and color shifts refer to approximately 50:50 blends. Corresponding diagrams in the CIELAB color space for the nine series of blends are given in FIGS. 1a to 1g.

As shown in the table, useful colour shifting properties of the blend were obtained with OVP-A and OVP-B having comparable hues (h values) at both relevant viewing angles. In these cases (i.e. the blends of ED 1819 with G/B, of ED 1820 with M/G and of ED 1821 with M/G) the colour shift is very satisfactory in respect to photocopying prevention. Very good results were obtained when hue values at the midpoint between orthogonal and grazing view were approximately equal for both, the OVP-A and the OVP-B. This is the case e.g. in the blend of ED 1821 with M/G).

Some OVP blends with partially antagonistic behavior of the constituents showed, surprisingly, striking color shifts, too, as the blend of ED 1821 with G/B (changing from green to almost black) or the blend of ED 1821 with B/R (changing from violet to brown).

A silk screen printing ink was produced by incorporating various percentages of OVP-A and/or OVP-B into a suitable ink matrix. The corresponding chroma and colour (hue) values h, according to the CIELAB color system, were measured on a printed and cured ink patch (silk screen prints made with a Hand Coater no. 3; measurements performed on a PHYMA Penta Gonio PG-5 instrument, using illumination/detection angles with respect to the normal of 22.5°/0° for orthogonal view, and of 45.0°/67.5° for grazing view), and are given as a function of the blend composition in Tables 1a to 1g and in the corresponding FIGS. 1a to 1g and FIG. 2.

TABLE 1a

Green-to-Blue with ED 1819

|  | orthogonal view | | grazing view | |
| --- | --- | --- | --- | --- |
|  | C* | h | C* | h |
| Point 1: | | | | |
| 100% G/B | 66.5 | 132.4° | 43.6 | 273.9° |
| mean hue <h> | | 203.2° | | |
| Point 2: | | | | |
| 100% ED 1819 | 49.1 | 95.8° | 11.9 | 38.3° |
| mean hue <h> | | 67.1° | | |
| Point 3: | | | | |
| 59% G/B 41% ED 1819 | 53.5 | 118.6° | 22.2 | 284.6° |
| Point 4: | | | | |
| 41% G/B 59% ED 1819 | 51.4 | 111.6° | 13.9 | 298.2° |

TABLE 1b

Magenta-to-Green with ED 1820

|  | orthogonal view | | grazing view | |
| --- | --- | --- | --- | --- |
|  | C* | h | C* | h |
| Point 1: | | | | |
| 100% M/G | 59.1 | 323.4° | 38.8 | 114.7° |
| mean hue <h> | | 39.1° | | |
| Point 2: | | | | |
| 100% ED 1820 | 26.0 | 9.3° | 45.2 | 78.8° |
| mean hue <h> | | 44.1° | | |
| Point 3: | | | | |
| 59% M/G 41% ED 1820 | 39.1 | 333.7° | 39.7 | 97.2° |
| Point 4: | | | | |
| 41% M/G 59% ED 1820 | 33.2 | 341.3° | 40.5 | 91.1° |

TABLE 1c

Green-to-Blue with ED 1820

|  | orthogonal view | | grazing view | |
| --- | --- | --- | --- | --- |
|  | C* | h | C* | h |
| Point 1: | | | | |
| 100% G/B | 66.5 | 132.4° | 43.6 | 273.9° |
| mean hue <h> | | 203.2° | | |

TABLE 1c-continued

Green-to-Blue with ED 1820

|  | orthogonal view | | grazing view | |
| --- | --- | --- | --- | --- |
|  | C* | h | C* | h |
| Point 2: | | | | |
| 100% ED 1820 | 26.0 | 9.3° | 45.2 | 78.8° |
| mean hue <h> | | 44.1° | | |
| Point 3: | | | | |
| 59% G/B 41% ED 1820 | 31.9 | 118.9° | 11.2 | 296.9° |
| Point 4: | | | | |
| 41% G/B 59% ED 1820 | 20.1 | 98.7° | 8.7 | 45.9° |

TABLE 1d

Blue-to-Red with ED 1820

|  | orthogonal view | | grazing view | |
| --- | --- | --- | --- | --- |
|  | C* | h | C* | h |
| Point 1: | | | | |
| 100% B/R | 63.3 | 282.8° | 24.7 | 13.3° |
| mean hue <h> | | 328.1° | | |
| Point 2: | | | | |
| 100% ED 1820 | 26.0 | 9.3° | 45.2 | 78.8° |
| mean hue <h> | | 44.1° | | |
| Point 3: | | | | |
| 59% B/R 41% ED 1820 | 38.1 | 299.0° | 26.9 | 53.4° |
| Point 4: | | | | |
| 41% B/R 59% ED 1820 | 30.3 | 312.7° | 31.3 | 65.1° |

TABLE 1e

Magenta-to-Green with ED 1821

|  | orthogonal view | | grazing view | |
| --- | --- | --- | --- | --- |
|  | C* | h | C* | h |
| Point 1: | | | | |
| 100% M/G | 59.1 | 323.4° | 38.8 | 114.7° |
| mean hue <h> | | 39.1° | | |
| Point 2: | | | | |
| 100% ED 1821 | 34.4 | 7.2° | 31.6 | 67.5° |
| mean hue <h> | | 37.4° | | |
| Point 3: | | | | |
| 59% M/G 41% ED 1821 | 47.7 | 330.3° | 33.1 | 102.4° |
| Point 4: | | | | |
| 41% M/G 59% ED 1821 | 40.6 | 336.8° | 30.9 | 93.7° |

TABLE 1f

Green-to-Blue with ED 1821

|  | orthogonal view | | grazing view | |
|---|---|---|---|---|
|  | C* | h | C* | h |
| Point 1: | | | | |
| 100% G/B | 66.5 | 132.4° | 43.6 | 273.9° |
| mean hue <h> | | 203.2° | | |
| Point 2: | | | | |
| 100% ED 1821 | 34.4 | 7.2° | 31.6 | 67.5° |
| mean hue <h> | | 37.4° | | |
| Point 3: | | | | |
| 59% G/B | 38.0 | 125.6° | 21.1 | 283.3° |
| 41% ED 1821 | | | | |
| Point 4: | | | | |
| 41% G/B | 23.8 | 111.0° | 10.0 | 308.5° |
| 59% ED 1821 | | | | |

TABLE 1g

Blue-to-Red with ED 1821

|  | orthogonal view | | grazing view | |
|---|---|---|---|---|
|  | C* | h | C* | h |
| Point 1: | | | | |
| 100% B/R | 63.3 | 282.8° | 24.7 | 13.3° |
| mean hue <h> | | 328.1° | | |
| Point 2: | | | | |
| 100% ED 1821 | 34.4 | 7.2° | 31.6 | 67.5° |
| mean hue <h> | | 37.4° | | |
| Point 3: | | | | |
| 59% B/R | 47.7 | 293.9° | 22.5 | 36.4° |
| 41% ED 1821 | | | | |
| Point 4: | | | | |
| 41% B/R | 39.4 | 304.2° | 23.3 | 47.7° |
| 59% ED 1821 | | | | |

The chemical resistance with respect to caustic soda, (2% solution in water, 30 minutes, 25° C.), to saturated solution of sodiumsulphate in water, (30 minutes, 25° C.) and to industrial laundry (30 minutes 95° C.) was dramatically increased for the blends. Whereas an ink layer with an ink according to 100% OVP A simply becomes black and loses the colour shift entirely, an ink layer with an ink according to the blends only becomes a bit darker in colour but keeps colour and colour-shift.

What is claimed is:

1. An ink composition comprising:
   a polymer resin binder;
   a blend comprising first optically variable dichroic pigment flakes, said flakes comprising a comniinuted multi-layered thin film interference structure comprising a stack of entirely parallel and planar layers in which at least one of the layers is totally reflecting, having first and second planar surfaces parallel to each other, and deposited on at least one of the planar surfaces, at least one dielectric layer which is transparent to visible light; and
   second optically variable dichroic pigments comprising a multi-layered thin film interference structure comprising a reflecting plate-like core layer in which the reflecting core layer is completely enclosed by at least one layer selected from the group consisting of transparent dielectric layer, semi-opaque metal layer and metal-oxide layer;
   said first and the second optically dichroic pigments being selected so that they are not chromatically antagonistic to one another.

2. An ink composition according to claim 1 wherein both the first and the second optically variable dichroic pigments have an orthogonal color, as observed in an orthogonal view, and a grazing color, as observed in a grazing view, said orthogonal color having an orthogonal hue value and said grazing color having a grazing hue value, wherein the value of said orthogonal hue and said grazing hue are different from one another.

3. An ink composition according to claim 2, wherein a first bisector of an angle spread between said orthogonal and said grazing hue values of said first optically-variable dichroic pigment and a second bisector of an angle spread between said orthogonal and said grazing hues of the second optically variable dichroic pigments differ by not more than 30°.

4. An ink composition according to claim 1, wherein the orthogonal color of the first ally variable dichroic pigment has a chroma C* of at least 50 and the orthogonal color of second optically variable dichroic variable pigment has a chroma C* below 50.

5. An ink composition according to claim 1, wherein the multi-layered thin film interference structure of the first dichroic pigment is symmetric, having on both of said surface of the reflecting layer at least one transparent dielectric layer having an index of refraction not higher than 1.65 with surfaces parallel to the surface of the reflecting layer.

6. An ink composition according to claim 1, wherein the multi-layered thin film interference structure of the first dichroic pigment further comprises, disposed on at least one of said dielectric layers, a layer selected from the group consisting of semi-opaque metal layer and metal-oxide layer.

7. An ink composition according to claim 1, wherein the multi-layered thin-film interference structure of the second dichroic pigment further comprises, disposed on the dielectric layer, a layer selected from the group consisting of semi-opaque metal layer and metal oxide layer.

8. An ink composition according to claim 1, wherein the reflecting layer of at least one of the multi-layered thin film interference structures of the first and second dichroic pigments is a layer selected from the group consisting of semi-opaque metal layer and metal oxide layer.

9. An ink composition according to claim 1, wherein at least one layer of the multi-layered interference structure of the second dichroic pigment is produced by chemical vapor deposition.

10. An ink composition according to claim 1, wherein the ratio between said first and said second optically variable dichroic pigments is between 1:10 and 10:1 by weight.

11. An ink composition according to claim 1, wherein the ratio between said first and said second optically variable dichroic pigments is between 1:1.5 and 1:0.6 by weight.

12. An ink composition according to claim 1, wherein the color shift of the multi-layered structure of the second dichroic pigment with change in the viewing angle is less and the chroma is less compared with that of the interference structure of the first dichroic pigment.

13. A security document having a first and a second surface, at least part of the area of one of said surfaces being coated with an ink composition according to claim 1.

14. An ink composition comprising:

a polymer resin binder;

a blend comprising first optically variable dichroic pigment flakes, said flakes comprising a committed multi-layered thin film interference structure comprising a stack of entirely parallel and planar layers in which at least one of the layers is totally reflecting, having first and second planar surfaces parallel to each other, and deposited on at least one of the planar surfaces, at least one dielectric layer which is transparent to visible light; and second optically variable multi-layered thin film dichroic pigments comprising a reflecting plate-like core layer in which the reflecting core layer is completely enclosed by at least one layer selected from the group consisting of transparent dielectric layer, semi-opaque metal layer and metal-oxide layer;

the first optically variable dichroic pigment and the second optically variable dichroic pigment having hues which are substantially the same.

15. An ink composition according to claim 14, wherein the chroma C* of the first optically variable dichroic pigment in orthogonal view is at least 50 and the chroma C* of the second optically variable dichroic variable pigment in orthogonal view is below 50.

16. An ink composition according to claim 14, wherein the multi-layered thin film interference structure of the first dichroic pigment is symmetric, having on both of said surface of the reflecting layer at least one transparent dielectric layer having an index of refraction not higher than 1.65 with surfaces parallel to the surface of the reflecting layer.

17. An ink composition according to claim 14, wherein the multi-layered thin film interference structure of the first dichroic pigment further comprises, disposed on at least one of said dielectric layers, a layer selected from the group consisting of semi-opaque metal layer and metal oxide layer.

18. An ink composition according to claim 14, wherein the multi-layered thin-film interference structure of the second dichroic pigment further comprises, disposed on the dielectric layer, a layer selected from the group consisting of semi-opaque metal layer and metal oxide layer.

19. An ink composition according to claim 14, wherein the reflecting layer of at least one of the multi-layered thin film interference structures of the first and second dichroic pigments is a layer selected from the group consisting of semi-opaque metal layer and metal oxide layer.

20. An ink composition according to claim 14, wherein at least one layer of the multi-layered interference structure of the second dichroic pigment is produced by chemical vapor deposition.

21. An ink composition according to claim 14, wherein the ratio between said first and said second optically variable dichroic pigments is between 1:10 and 10:1 by weight.

22. An ink composition according to claim 14, wherein the ratio between said first and said second optically variable dichroic pigments is between 1:1.5 and 1:0.6 by weight.

23. An ink composition according to claim 14, wherein the color shift of the multi-layered structure of the second dichroic pigment with change in the viewing angle is less and the chroma is less compared with that of the interference structure of the first dichroic pigment.

24. A security document having a first and a second surface, at least part of the area of one of said surfaces being coated with an ink composition according to claim 14.

25. A blend of first optically variable dichroic pigment flakes, said flakes comprising a committed multi-layered thin film interference structure comprising a stack of entirely parallel and planar layers in which at least one of the layers is totally reflecting, having first and second planar surfaces parallel to each other, and deposited on at least one of the planar surfaces, at least one dielectric layer which is transparent to visible light; and second optically variable dichroic pigments comprising a multi-layered think film interference structure comprising a reflecting plate-like core layer in which the reflecting core layer is completely enclosed by at least one layer selected from the group consisting of transparent dielectric layer, semi-opaque metal layer and metal-oxide layer;

said first and the second optically dichroic pigments being selected so that they are not chromatically antagonistic to one another.

26. A blend of pigment flakes according to claim 25, wherein the chroma C* of the first optically variable dichroic pigment in orthogonal view is at least 50 and the chroma C* of the second optically variable dichroic variable pigment in orthogonal view is below 50.

27. A blend of pigment flakes according to claim 25, wherein midpoints of the hues between orthogonal and grazing view of said first and said second optically variable pigments differ from each other by no more than 30°.

28. A blend of pigment flakes according to claim 25, wherein the multi-layered thin film interference structure of the first dichroic pigment is symmetric, having on both of said surface of the reflecting layer at least one transparent dielectric layer having an index of refraction not higher than 1.65 with surfaces parallel to the surface of the reflecting layer.

29. A blend of pigment flakes according to claim 25, wherein the multi-layered thin film interference structure of the first dichroic pigment further comprises, disposed on at least one of said dielectric layers, a layer selected from the group consisting of semi-opaque metal layer and metal oxide layer.

30. A blend of pigment flakes according to claim 25, wherein the multi-layered thin-film interference structure of the second dichroic pigment further comprises, disposed on the dielectric layer, a layer selected from the group consisting of semi-opaque metal layer and metal oxide layer.

31. A blend of pigment flakes according to claim 25, wherein the reflecting layer of at least one of the multi-layered thin film interference structures of the first and second dichroic pigments is a layer selected from the group consisting of semi-opaque metal layer and metal oxide layer.

32. A blend of pigment flakes according to claim 25, wherein at least one layer of the second multi-layered interference structure of the second dichroic pigment is produced by chemical vapor deposition.

33. A blend of pigment flakes according to claim 25, wherein the ratio between said first and said second optically variable dichroic pigments is between 1:10 and 10:1 by weight.

34. A blend of pigment flakes according to claim 25, wherein the ratio between said first and said second optically variable dichroic pigments is between 1:1.5 and 1:0.6 by weight.

35. A blend of pigment flakes according to claim 25, wherein the color shift of the multi-layered structure of the second dichroic pigment with change in the viewing angle is less and the chroma is less compared with the interference structure of the first dichroic pigment.

* * * * *